United States Patent
Patel et al.

(10) Patent No.: US 7,962,769 B1
(45) Date of Patent: Jun. 14, 2011

(54) BALANCING OF RENEWABLE POWER USAGE AND WORKLOAD PERFORMANCE BETWEEN COOLING SYSTEM AND ELECTRONIC COMPONENTS

(75) Inventors: Chandrakant Patel, Fremont, CA (US); Ratnesh Kumar Sharma, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1077 days.

(21) Appl. No.: 11/796,942

(22) Filed: Apr. 30, 2007

(51) Int. Cl.
*G06F 1/26* (2006.01)

(52) U.S. Cl. ............. 713/300; 307/25; 307/80; 700/267

(58) Field of Classification Search .................. 713/320, 713/300; 307/25, 80; 700/278
See application file for complete search history.

(56) References Cited

U.S. PATENT DOCUMENTS

| 7,315,769 B2 * | 1/2008 | Balan et al. ................... 700/286 |
| 7,444,189 B1 * | 10/2008 | Marhoefer ....................... 700/26 |
| 2009/0319090 A1 * | 12/2009 | Dillon et al. ................... 700/291 |

OTHER PUBLICATIONS

Patel, C.D. et al., "Cost Model for Planning, Development and Operation of Data Center", HPL-2005-107, HP Laboratories Palo Alto, Jun. 2005.

* cited by examiner

*Primary Examiner* — Albert Wang

(57) ABSTRACT

In a method for balancing renewable power usage and workload performance in a room having cooling system components and electronic components, power is supplied to either or both of at least one cooling system component and at least one electronic component from a renewable power source. In addition, power is supplied to either or both of the at least one cooling system component and the at least one electronic component from a nonrenewable power source. The power supplied from at least one of the renewable power source and the nonrenewable power source to balance power usage and workload performance between the at least one cooling system component and the at least one electronic component.

20 Claims, 9 Drawing Sheets

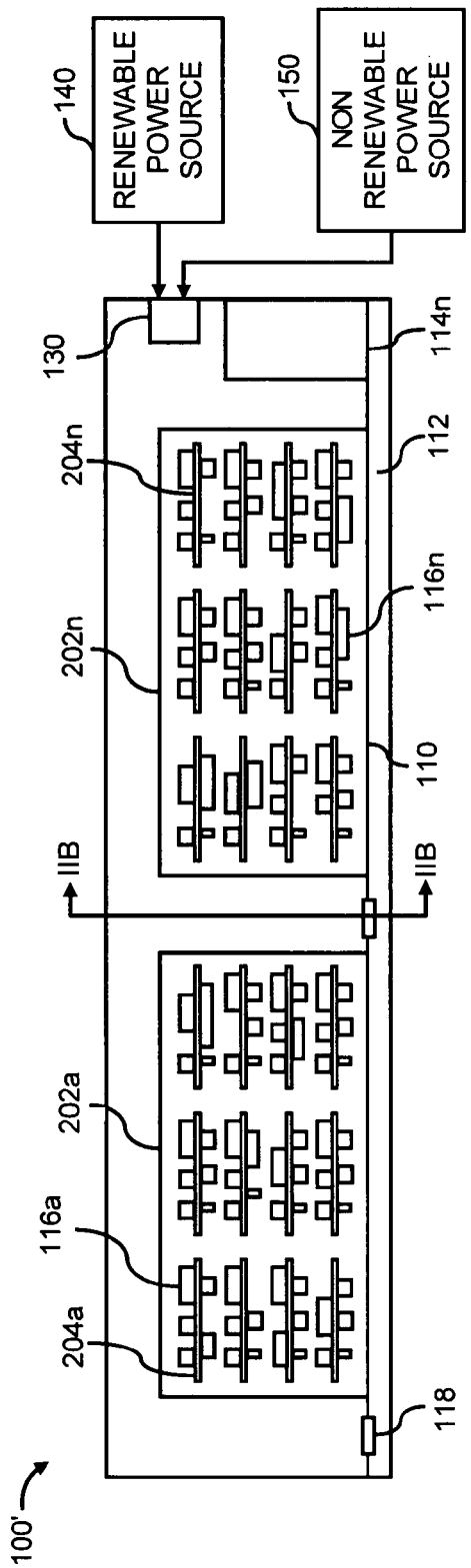
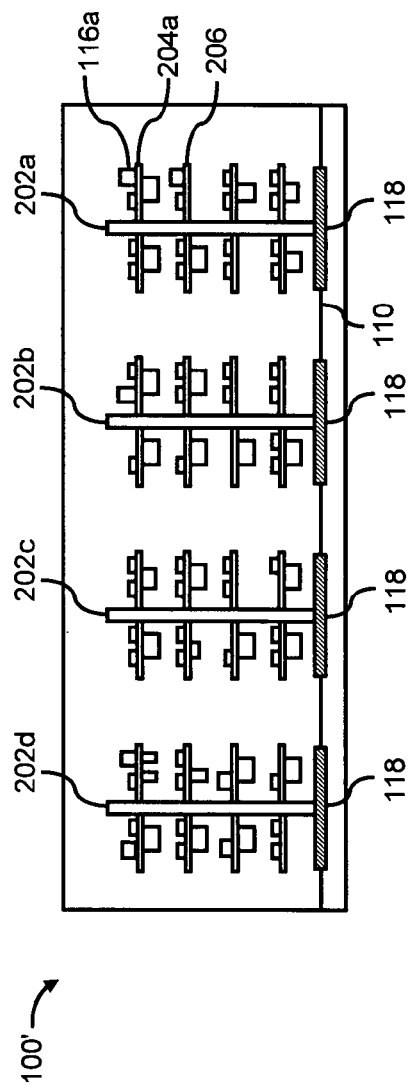
FIG. 2A
FIG. 2B

BALANCING OF RENEWABLE POWER USAGE AND WORKLOAD PERFORMANCE BETWEEN COOLING SYSTEM AND ELECTRONIC COMPONENTS

BACKGROUND

A data center may be defined as a location, for instance, a room that houses computer systems arranged in a number of racks. These racks are configured to house a number of computer systems which typically include a number of printed circuit boards (PCBs), mass storage devices, power supplies, processors, micro-controllers, and semi-conductor devices, that dissipate relatively significant amounts of heat during their operation. As such, the computer systems often consume a great deal of energy in performing various computing functions.

Air conditioning units are often provided to cool the computer systems. In cooling the computer systems, the air conditioning units also consume a great deal of energy. In fact, it is estimated that the burdened cost of power for the computer systems, the cooling systems, as well as other devices that require electrical energy, is approximately 30% of the total cost of ownership of a typical data center.

One approach to reducing the energy costs, as well as, to reduce impact on the environment, has been to use renewable energy, such as, solar power and wind power, to power the computer systems and the air conditioning units. Conventional approaches to relying on renewable energy, however, often suffer from various drawbacks. For instance, when the amount of renewable energy drops, such as, when clouds block solar collectors, the computing performance as well as the air conditioning unit performance also drops. Although this drop in performance may be acceptable for some applications, it is not a viable solution for most, more critical applications.

BRIEF DESCRIPTION OF THE DRAWINGS

Features of the present invention will become apparent to those skilled in the art from the following description with reference to the figures, in which:

FIG. 2A shows a simplified side elevational view of a section of the a data center which may employ various examples of a system for balancing renewable power usage with workload performance disclosed herein, according to another embodiment of the invention;

FIG. 2B shows a simplified front elevational view taken along lines IIB-IIB in FIG. 2A, according to an embodiment of the invention;

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and system for balancing renewable energy usage and workload performance in a room, such as, a data center. As discussed in greater detail herein below, a system manager is provided to control the delivery of power from a renewable power source and a nonrenewable power source to electronic components and cooling system components contained in the room. In one example, the system manager may control power delivery, which may include workload performance, to meet a given total cost of ownership. In this example, the system manager may vary workload performance based upon the amount of power generated by the renewable power source, where the renewable power is used to power the cooling system components.

In another example, the system manager may control power delivery, including workload performance, to generally ensure that given workloads are performed as scheduled. In either example, the system manager may vary power delivery from a nonrenewable power source and/or workload performance according to provisions or conditions set forth in a service level agreement, for instance, between a data center operator a client wishing to employ the data center. As such, for instance, relatively critical workloads may still be performed in situations where the amount of renewable power may be relatively low.

Figure 1:
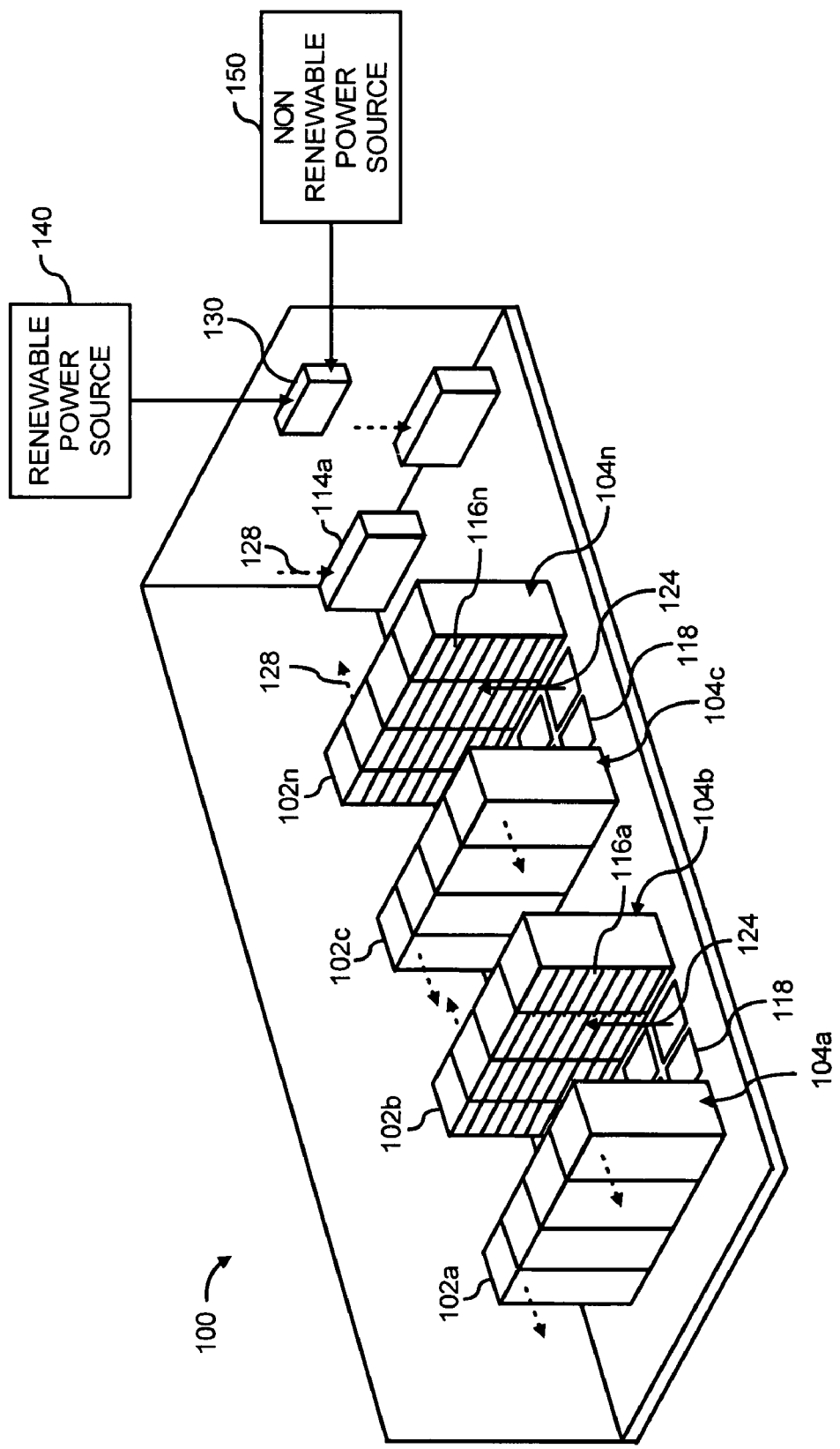
FIG. 1 shows a perspective view of a section of a data center which may employ various examples of a system for balancing renewable power usage with workload performance disclosed herein, according to an embodiment of the invention.

With reference first to FIG. 1, there is shown a simplified perspective view of a section of a data center 100 which may employ various examples of a system for balancing renewable power usage with workload performance disclosed herein, according to an example. The terms "data center" are generally meant to denote a room or other space where one or more components capable of generating heat may be situated. In this respect, the terms "data center" are not meant to limit embodiments of the invention to any specific type of room where data is communicated or processed, nor should it be construed that use of the terms "data center" limits the invention in any respect other than its definition herein above.

The data center 100 is depicted as having a plurality of racks 102a-102n, where "n" is an integer. The racks 102a-102n may comprise, for instance, electronics cabinets configured to house electronic components 116a-116n, for instance, computers, servers, bladed servers, disk drives, displays, switches, routers, etc. The electronic components 116a-116n may also describe the subsystems and the components may be operated to perform various electronic functions, for instance, computing, switching, routing, displaying, and the like. In this regard, the electronic components 116a-116n may also comprise, processors, memories, power supplies, etc.

The racks 102a-102n are depicted as being positioned on a raised floor 110, which may function as a plenum for delivery of cooled air from one or more air moving devices 114a-114n. The air moving devices 114a-114n, where "n" is an integer, generally operate to supply airflow into a space 112 beneath a raised floor 110, and in certain instances to cool heated air (indicated by the arrows 128). In addition, the air moving devices 114a-114n may supply the electronic components 116a-116n housed in the racks 102a-102n with airflow that has been cooled, through any reasonably suitable known manners and may thus comprise widely available, conventional air conditioning (AC) units. For instance, the air moving devices 114a-114n may comprise vapor-compression type air conditioning units, chiller type air conditioning units, etc. Examples of suitable air moving devices 114a-114n may be found in co-pending and commonly assigned U.S. patent application Ser. No. 10/853,529, filed on May 26, 2004, and entitled "Energy Efficient CRAC Unit Operation," the disclosure of which is hereby incorporated by reference in its entirety.

The air moving devices 114a-114n include respective actuators (not shown) configured to manipulate characteristics of the cooled airflow supplied to the racks 102a-102n, such as airflow temperature and supply rate. As such, the actuators include, for instance, devices for manipulating airflow temperature, such as chillers, heat exchangers, etc., and devices for manipulating the supply flow rates, such as variable frequency devices, blowers, etc., of the cooled air.

The cooled air, indicated by the arrows 124, may be delivered from the space 112 to the racks 102a-102n through air delivery devices 118 located between some or all of the racks 102a-102n. The air delivery devices 118 may comprise, for instance, ventilation tiles, variable airflow volume devices, etc., and are shown as being located between rows 104a and 104b and 104c and 104d. Although the air delivery devices 118 and the space 112 have been depicted as being located on a floor of the data center 100, it should be understood that the air delivery devices 118 and the space 112 may be positioned on the ceiling or a wall of the data center 100 without departing from a scope of the invention.

Also depicted in FIG. 1 is a system manager 130 configured to control various operations in the data center 100, such as, power delivery to the electronic components 116a-116n and the air moving devices 114a-114n. Although not shown, the system manager 130 may also control power delivery to various other components in the data center 100 that draw electrical energy, such as, lighting, networking equipment, etc.

The system manager 130 is configured to selectively supply power to the electronic components 116a-116n and cooling system components 310 (FIG. 3), which may include the air moving devices 114a-114n, the air delivery devices 118, etc., from a renewable power source 140 and a nonrenewable power source 150. The renewable power source 140 may generate power, for instance, from solar power, wind power, tidal power, ocean thermal energy conversion, hydroelectric power, etc. In this regard, for instance, the renewable power source 140 may comprise photovoltaic cells, wind operated turbines, etc.

Power supplied from the nonrenewable power source 150 may comprise power supplied from a public utility company, a diesel engine generator, a bi-fuel generator, a micro-turbine, etc. In this regard, the nonrenewable power source 150 may generally be defined as a power source that consumes a natural resource or originates from a utility company.

Generally speaking, the system manager 130 is configured to control power delivery from one or both of the renewable power source 140 and the nonrenewable power source 150 to balance power usage with workload performance in the data center 100. In other words, the system manager 130 is configured to maximize usage of power supplied by the renewable power source 140, to thereby substantially minimize usage of the relatively more expensive power supplied by the nonrenewable power source 150, while substantially maintaining predetermined minimum levels of workload performance.

Although reference is made throughout the present disclosure of a single renewable power source 140 and a single nonrenewable power source 150, it should be understood that the system manager 130 may supply power to the electronic components 116a-116n and the cooling system components from additional renewable and nonrenewable power sources.

According to an example, the system manager 130 is configured to control either or both of the cooling system components 310 (FIG. 3), such as air moving devices 114a-114n, air delivery devices 118, etc., and placement of workload on the electronic components 116a-116n, to generally enable maximized usage of power generated by the renewable power source 140. The placement of workload on the electronic components 116a-116n may include both physical placement as well as time-dependent placement of the workload.

Although the system manager 130 is illustrated in FIG. 1 as comprising an element separate from the electronic components 116a-116n, the system manager 130 may comprise one or more of the electronic components 116a-116n without departing from a scope of the data center 100 disclosed herein. In addition, or alternatively, the system manager 130 may comprise software configured to operate on a computing device, for instance, one of the electronic components 116a-116n or a separate computing device. In any regard, various manners in which the system manager 130 may selectively control the delivery of power from the renewable and nonrenewable power sources 140, 150 are described in greater detail herein below.

With reference now to FIG. 2A, there is shown a simplified side elevational view of a section of a data center 100' which may employ various examples of a system for balancing renewable power usage with workload performance disclosed herein, according to another example. The data center 100' depicted in FIG. 2A is similar to the data center 100 depicted in FIG. 1 and thus contains similar elements. Those elements having common reference numerals are not discussed again with respect to FIG. 2A. Instead, only those elements that differ between the two figures are described.

Generally speaking, the data center 100' depicted in FIG. 2A may require relatively less energy to maintain the electronic components 116a-116n within desired environmental conditions due to its relatively more streamlined design. More particularly, for instance, airflow movement across the electronic components 116a-116n housed in the data center 100' may be less impeded as compared with those housed in the data center 100, due to the reduction of airflow obstacles in the data center 100', as described in greater detail herein below.

By way of example, the data center 100' differs from the data center 100 depicted in FIG. 1 in that the racks 104a-104n have been replaced with spines 202a-202n. The spines 202a-202n generally comprise substantially rigid, vertically extending, structures configured to support a plurality of electronic components 116a-116n, while reducing blockage of airflow movement in the data center 100'. According to an example, the electronic components 116a-116n comprise compute blocks 204a-204n, which are described in greater detail herein below. In another example, the compute blocks 204a-204n may support the electronic components 116a-116n, as also described in greater detail herein below.

As shown more clearly in FIG. 2B, which shows a simplified front elevational view taken along lines IIB-IIB in FIG. 2A, the spines 202a-202n comprise relatively narrow structures by which airflow may more easily pass, as compared with the racks 104a-104n. In addition, the compute blocks 204a-204n are depicted as being supported by the spines 202a-202n, and may be supported, for instance, through use of mating mechanical devices (not shown). The mating mechanical devices may include, for instance, tongue and groove type fasteners, snap-fit type fasteners, friction-fit type fasteners, threaded fasteners, etc.

Alternatively, however, the compute blocks 204a-204n may be integrally formed with the spines 202a-202n. In this example, the electronic components 116a-116n may be positioned on the compute blocks 204a-204n in situ.

Although not shown, the spines 202a-202n and the compute blocks 204a-204n may also comprise power interfaces that enable the electronic components 116a-116n of the compute blocks 204a-204n to receive power through the spines 202a-202n. The spines 202a-202n and the compute blocks 204a-204n may also comprise communication interfaces that enable the electronic components 116a-116n to communicate with each other, with the system manager 130, or with various other computing devices, through an intranet or an extranet.

The compute blocks 204a-204n may comprise boards that support various electronic components 116a-116n, without exterior housings. Thus, for instance, the compute blocks 204a-204n may be considered as comprising dematerialized versions of servers, in that, the compute blocks 204a-204n are composed of all of the components of servers, without the sever housings. In addition, the compute blocks 204a-204n may also include all of the features of the server without internal fans for moving the airflow across the compute blocks 204a-204n. As such, airflow generated by the air moving devices 114a-114n is caused to move across the compute blocks 204a-204n (or electronic components 116a-116n) to thereby cool the compute blocks 204a-204n (or electronic components 116a-116n). Some of the compute blocks 204a-204n (or electronic components 116a-116n) may include heat sinks and/or individual fans for relatively increasing heat dissipation from various components, such as, processors, memories, etc., contained in the compute blocks 204a-204n (or electronic components 116a-116n).

In addition, or alternatively, the compute blocks 204a-204n may comprise processor modules, memory modules, etc. More particularly, for instance, one or more of the compute blocks 204a-204n may have relatively specialized functions and may thus be composed of primarily one type of electronic component, such as, processors, memories, etc.

According to an example, the air moving devices 114a-114n may be equipped with a relatively larger fan or with a relatively larger number of fans as compared with the air moving devices 114a-114n depicted in FIG. 1 to compensate, for instance, for the lack of localized fans in the compute blocks 204a-204n. In addition, although not shown, the air delivery devices 118 may include louvers configured to vary at least one of the magnitude and direction of airflow supplied through the air delivery devices 118. In addition, or alternatively, louvers (not shown) may be positioned at one or more locations in the data center 100' to control at least one of the magnitude and direction of airflow supplied to selected spines 202a-202n or compute blocks 204a-204n.

Figure 3:
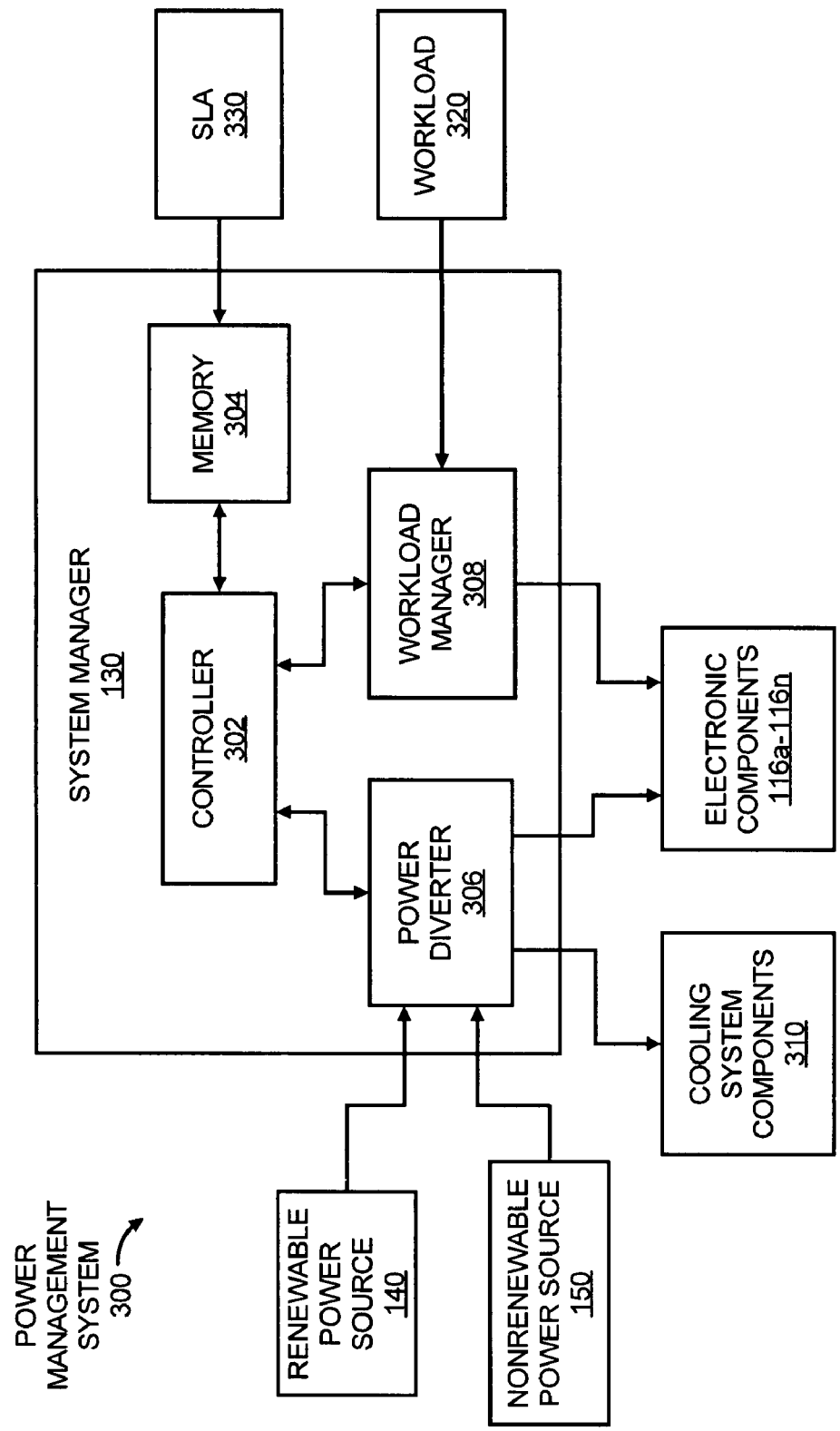
FIG. 3 shows a block diagram of a system for power management in a data center, according to an embodiment of the invention.

With reference now to FIG. 3, there is shown a block diagram of a system 300 for power management in a room, such as a data center 100, 100', according to an example. It should be understood that the following description of the block diagram is but one manner of a variety of different manners in which such a power management system 300 may be configured. In addition, it should be understood that the power management system 300 may include additional components and that some of the components described herein may be removed and/or modified without departing from a scope of the power management system 300. For instance, the power management system 300 may be configured to manage power supplied to multiple rooms containing multiple sets of cooling system components 310 and electronic components 116a-116n.

As shown in FIG. 3, the power management system 300 includes the system manager 130 depicted in FIGS. 1 and 2A, which may comprise any of the computing devices described above. The power management system 130 may moreover comprise a microprocessor, a micro-controller, an application specific integrated circuit (ASIC), and the like, configured to perform various processing functions. In addition, or alternatively, the power management system 130 may comprise software operating in any of a number of computing devices.

In one example, the system manager 130 comprises a computing device and the controller 302 comprises a microprocessor of the computing device. In this example, the controller 302 may access a memory 304 configured to store software or algorithms that provide the functionality of the controller 302. In this regard, the memory 304 may comprise, for instance, volatile or non-volatile memory, such as DRAM, EEPROM, MRAM, flash memory, floppy disk, a CD-ROM, a DVD-ROM, or other optical or magnetic media, and the like.

The controller 302 is also configured to invoke or implement a power diverter 306. Generally speaking, the power diverter 306 comprises software, hardware, or a combination thereof designed to control the source from which either or both the electronic components 116a-116n, which may include the compute blocks 204a-204n, and the cooling system components 310, which may include the air moving devices 114a-114n, the air delivery devices 118, other airflow characteristic varying devices (such as, pumps, compressors, chillers, etc.), etc., receives power. In addition, the power diverter 306 may comprise devices (not shown) configured to physically divert power supplied from a renewable power source 140 and a nonrenewable power source 150 to either or both of the electronic components 116a-116n and the cooling system components 310.

In one regard, the power diverter 306 may supply power to the cooling system components 310 from one of the power sources 140, 150 and may supply power to the electronic components 116a-116n from the other of the power sources 140, 150. Moreover, the power diverter 306 may supply power to some of the cooling system components 310 from one power source 140, 150 while supplying power to the remaining cooling system components 310 from the other power source 140, 150. Likewise, the power diverter 306 may supply power to some of the electronic components 116a-116n from one power source 140, 150 while supplying power to the remaining electronic components 116a-116n from the other power source 140, 150.

The controller 302 is further configured to invoke or implement a workload manager 308. The workload manager 308 comprises software, hardware, or a combination thereof designed to receive workloads 320, which may be in the form of web requests, data analysis, multimedia rendering, or other types of applications. The workload manager 308 may also be designed to determine which of the electronic components 116a-116n comprise suitable configurations for performing the workloads 320. In addition, or alternatively, the workload manager 320 may determine which of those electronic components 116a-116n have sufficient capacities to perform the workloads 320. In any case, the workload manager 308 may assign the workload 320 to the selected one or more electronic components 116a-116n. However, prior to assigning the workload 320, the controller 302 may communicate instructions to the workload manager 308 to assign the workload 320 according to one or more control policies as described in greater detail herein below.

In one regard, the controller 302 is configured to invoke or implement the workload manager 308 to determine one or more of the requirements of the workload 320, the requirements of a service level agreement (SLA) 330 pertaining to the workload 320, the cooling requirements to perform the workload 320, the electronic components 116a-116n capable of performing the workload 320, etc., in placing the workload 320 among one or more electronic components 116a-116n.

The SLA 330 may define the total amount of power that is to be supplied to either or both of the cooling system components 310 and the electronic components 116a-116n from the renewable power source 140. In addition, or alternatively, the SLA 330 may set various other conditions, such as, the number of electronic components 116a-116n that are to be devoted to performing particular workloads 320, the times by which particular workloads 320 are to be completed, etc. In any regard, the provisions or conditions of the SLA 330 may be stored in the memory 304.

The controller 302 may access the SLA 330 provisions in determining how power from the renewable power source 140 and the nonrenewable power source 150 are to be supplied to either or both of the cooling system components 310 and the electronic components 116a-116n. In addition, or alternatively, the controller 302 may also access the SLA 330 provisions to determine how and when workloads 320 are placed on the electronic components 116a-116n. The controller 302 may, moreover, vary operations of one or more of the cooling system components 310 based upon the workload 320 placements.

Although the power management system 300 has been depicted as including a single renewable power source 140 and a single non-renewable power source 150, it should be understood that any reasonably suitable number of power sources 140, 150 may be employed to supply power to the electronic components 116a-116n.

In any regard, various operations of the components forming the power management system 300 are described in greater detail with respect to the following figures. In the following figures, FIG. 4 provides a relatively broad overview of the operations performed by the power management system 300 and FIGS. 5A-7 provide relatively more detailed operations.

Figure 4:
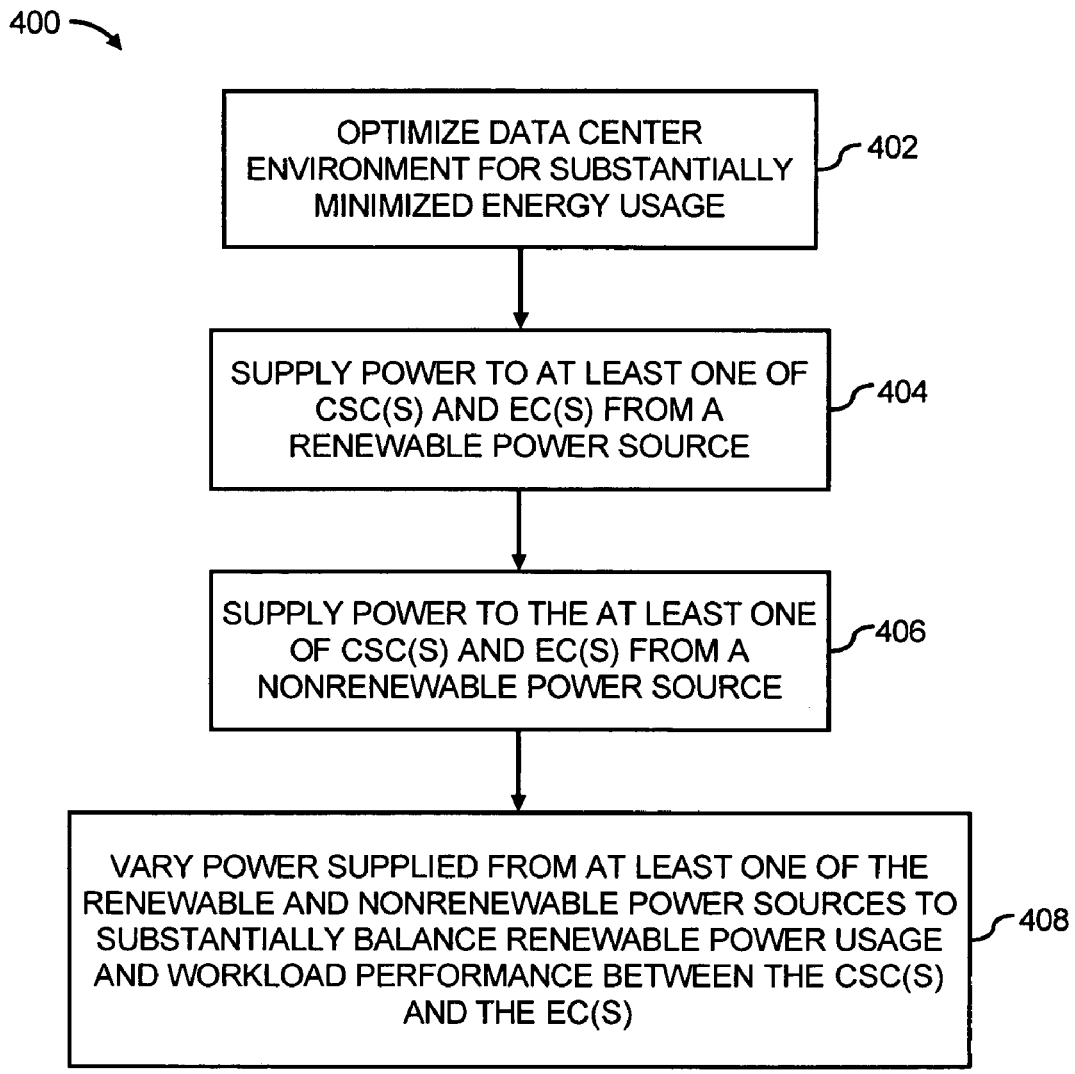
FIG. 4 shows a flow diagram of a method for balancing energy usage in a data center having cooling system components and electronic components, according to an embodiment of the invention.

With reference first to FIG. 4, there is shown a flow diagram of a method 400 for balancing energy usage in a data center 100, 100' having cooling system components 310 and electronic components 116a-116n, according to an example. It is to be understood that the following description of the method 400 is but one manner of a variety of different manners in which an example of the invention may be practiced. It should also be apparent to those of ordinary skill in the art that the method 400 represents a generalized illustration and that other steps may be added or existing steps may be removed, modified or rearranged without departing from a scope of the method 400.

The description of the method 400 is made with reference to the power management system 300 illustrated in FIG. 3, and thus makes reference to the elements cited therein. It should, however, be understood that the method 400 is not limited to the elements set forth in the power management system 300. Instead, it should be understood that the method 400 may be practiced by a system having a different configuration than that set forth in the power management system 300.

Generally speaking, the method 400 may be implemented by the system manager 130 to balance power usage in a data center 100, 100' among the electronic components 116a-116n and the cooling system components 310. The balance of power usage is also based upon maximizing power supplied by a renewable power source 140 while maintaining desired levels of computing performance by the electronic components 116a-116n. In one example, the desired levels of computing performance may be based upon conditions set forth in an SLA 330.

As an initial step, which may be performed, for instance, at a design and/or construction stage of the data center 100, 100', the data center 100, 100' environment may be optimized to substantially minimize energy usage, as indicated at step 402. More particularly, for instance, the data center 100, 100' may be designed and configured to optimize a coefficient of performance in the data center 100, 100', through, for instance, selection of the devices, hardware, etc., that are to be implemented in the data center 100, 100'. In one regard, the data center 100, 100' may be optimized by employing a plurality of dematerialized electronic components 116a-116n, such as, the compute blocks 204a-204n discussed above.

Once the devices and hardware, such as, the electronic components 116a-116n, the racks 104a-104n, the spines 202a-202n, etc., have been selected, the cooling system components 310 may be optimized. In addition, the cooling system components 310 may be dynamically operated in various smart manners as discussed, for instance, in U.S. Pat. No. 6,574,104, to Chandrakant Patel et al., issued on Jun. 3, 2003, the disclosure of which is hereby incorporated by reference in its entirety. Additional energy minimizing steps may be performed at step 402, such as, installation of energy efficient light bulbs, installation of insulation in the walls of the data center 100, 100', etc.

At step 404, power is supplied to either or both of at least one cooling system component (CSC) 310 and at least one electronic component (EC) 116a-116n from a renewable power source 140. In addition, at step 406, power is supplied to either or both of the at least one cooling system component 310 and at least one electronic component 116a-116n from a nonrenewable power source 150.

At step 408, the power supplied from at least one of the renewable power source 140 and the nonrenewable power source 150 is varied to balance power usage and workload performance between the cooling system component(s) 310 and the electronic component(s) 116a-116n. In other words, the amount of power supplied by the nonrenewable power source 150 may substantially be minimized while enabling desired levels of workload to be performed by the electronic components 116a-116n. Although not explicitly recited, the varying of power performed at step 408 may also include varying of power through varying of workload performance in terms of workload placement, workload performance timing, workload preference, etc.

Various manners in which the power supplied from at least one of the renewable power source 140 and the nonrenewable power source 150 are described in the methods depicted in the following flow diagrams. The selection of which of the methods to implement may depend upon the criticality of the workloads being placed. For instance, if the workload has a relatively low criticality, the controller 302 may select to implement either the method 500 or 600. On the other hand, if the workload has a relatively high criticality, the controller 302 may select to implement either the method 500' or 700. The criticality of the workloads may be set forth in the SLAs 330, for instance.

Figure 5A:
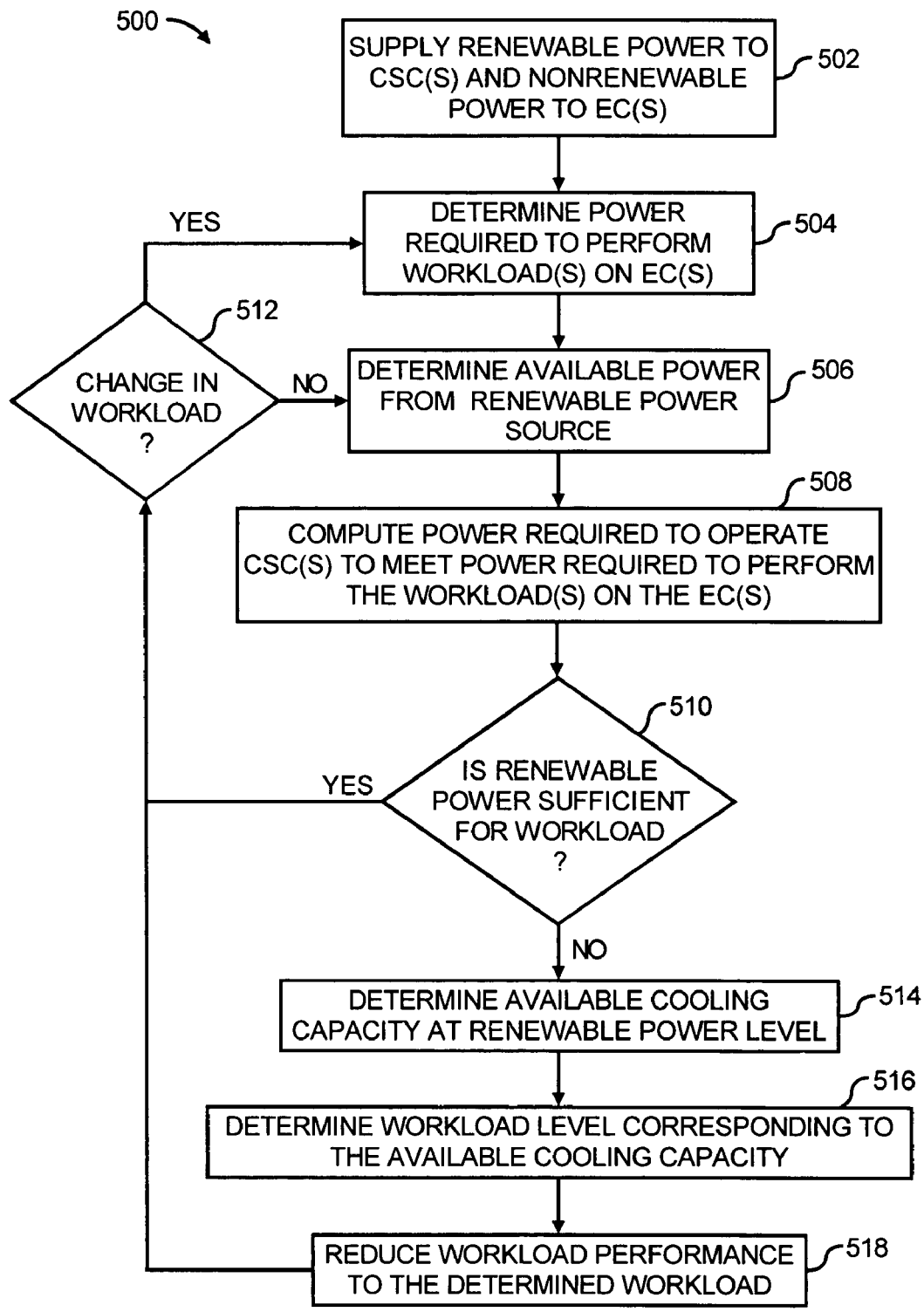
FIG. 5A shows a flow diagram of a method for varying the power supplied to balance power usage and workload performance, according to an embodiment of the invention.

Turning now to FIG. 5A, there is shown a flow diagram of a method 500 for varying the power supplied to balance power usage and workload performance, according to an example. The method 500 may be considered as providing a more detailed illustration of step 408 in FIG. 4. In addition, the method 500 generally depicts an operation of the system manager 130 in which a "sustainability" policy may be implemented. More particularly, in implementing the method 500, the system manager 130 may substantially ensure that the costs associated with maintaining the electronic components 116a-116n within predetermined thermal conditions may be sustained within predefined limits. In addition, or alternatively, the method 500 may be performed, for instance, in accordance with an SLA 330 that indicates that all of the cooling for the workload 320 is to be powered by the renewable power source 140, as may be set by an environmentally conscious client.

Initially, at step 502, the controller 302 is configured to implement the power diverter 306 to supply power to the cooling system components 310 from the renewable power source 140 and to supply power to the electronic components 116a-116n from the nonrenewable power source 150. In addition, at step 504, the controller 302 may determine the amount of power the electronic components 116a-116n require to perform a given workload 320, for instance, based upon information received by the workload manager 308.

At step 506, the controller 302 may also determine the amount of power being generated by the renewable power source 140, and may thus determine how much power is available from the renewable power source 140. In addition, or alternatively, the controller 302 may calculate a projected power generation amount by the renewable power source 140 based upon a plurality of factors. The factors may include, for instance, the time of day, ambient weather conditions, infrastructure and installed-capacity constraints, etc.

At step 508, the controller 302 may compute how much power the cooling system components require to meet the power requirements of the electronic components 116a-116n in performing the workload 320. In other words, the controller 302 may determine what the cooling requirements are for the amount of power dissipated by the electronic components 116a-116n in performing the workload 320. The controller 302 may correlate the cooling requirements to energy usage of the cooling system components 310. In one example, the correlations may be based upon testing, manufacturer guidelines, etc., and may be stored in the memory 304 for relatively easy access by the controller 302.

At step 510, the controller 302 may determine whether the amount of power available from the renewable power source 140 is sufficient to operate the cooling system components 310 at the level determined at step 508. If the controller 302 determines that the renewable power source 140 is generating a sufficient amount of power, the controller 302 may determine whether there has been a change in the workload 320, as indicated at step 512. If there has been a change in the workload 320, the controller 302 may determine the amount of power required to perform the changed workload at step 504.

Following step 504, or if there has not been a change in the workload 320, the controller 302 may determine the amount of power being generated by the renewable power source 140 at step 506. In addition, the controller 302 may repeat steps 504-512 to continually monitor the workload and cooling conditions in the data center 100, 100'.

With reference back to step 510, if the controller 302 determines that the renewable power source 140 is generating an insufficient amount of power, the controller 302 may determine the available cooling capacity of the cooling system components 310 at the current renewable power source 140 power generation level, as indicated at step 514. In addition, at step 516, the controller 302 may determine the workload level that corresponds to the available cooling capacity, for instance, based upon a look-up table stored in the memory 304.

In any regard, at step 518, the controller 302 may invoke or implement the workload manager 308 to reduce the workload performance to the workload level determined at step 516. The controller 302 may reduce the workload performance by, for instance, reducing the number of electronic components 116a-116n being utilized to perform workloads 320, by scheduling performance of new workloads 320 to a later time, etc. In any regard, the controller 302 may employ virtual machine technology to rearrange the placement of workloads on the electronic components 116a-116n. The controller 302 may additionally rate the workloads according to their criticalities and may stop performance of or schedule a later performance of those workloads 320 that are considered as being relatively less critical. The criticalities of the workloads 320 may be based, for instance, on various conditions set forth in SLA's 330.

Following step 518, the controller 302 may repeat steps 512 and 504-518 as discussed above, to continually monitor and control the workload and cooling conditions in the data center 100, 100', and thereby balance renewable power usage with workload performance.

Figure 5B:
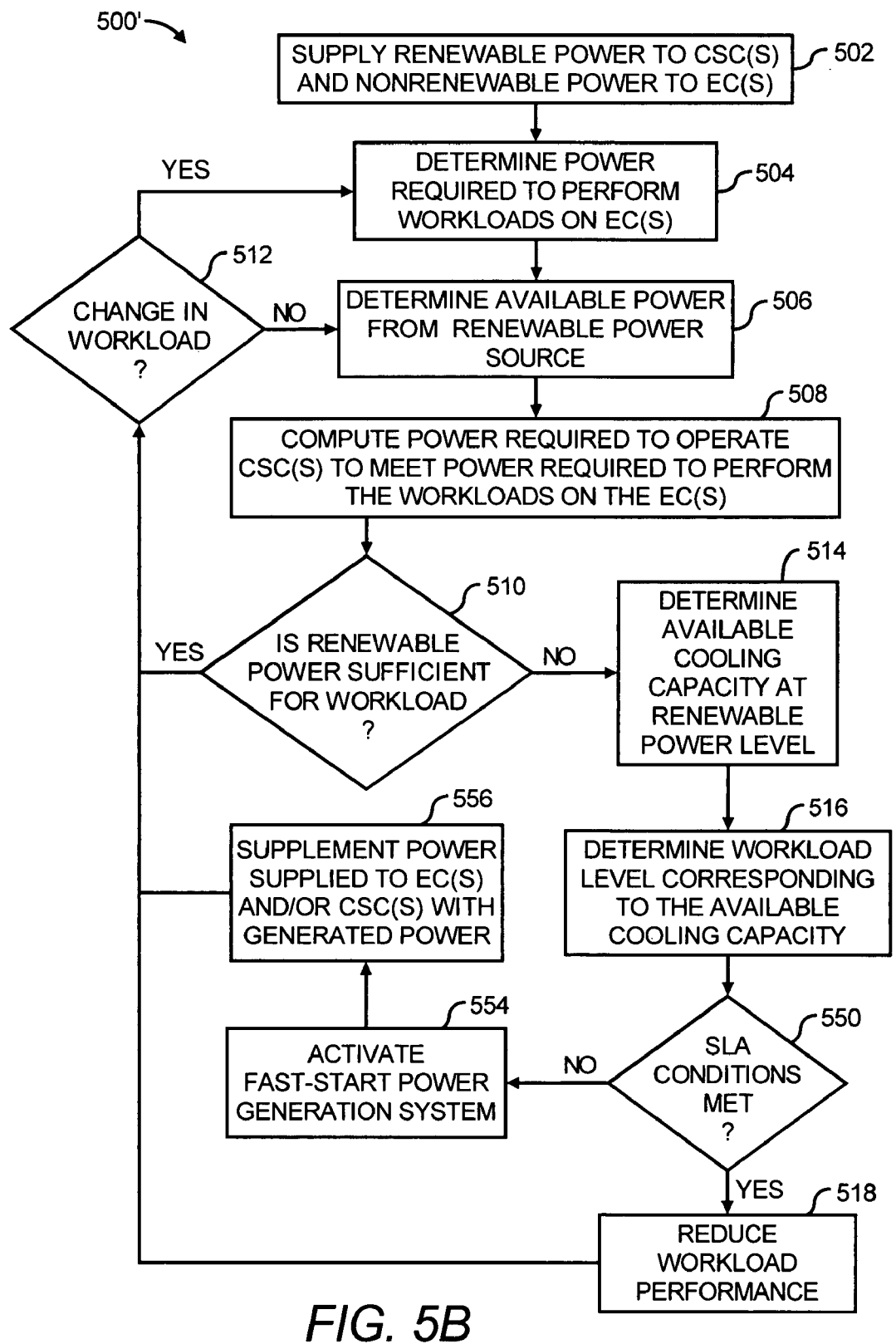
FIG. 5B shows a flow diagram of a method for varying the power supplied to balance power usage and workload performance, according to another embodiment of the invention.

Turning now to FIG. 5B, there is shown a flow diagram of a method 500' for varying the power supplied to balance power usage and workload performance, according to another example. The method 500' may be considered as providing a more detailed illustration of step 408 in FIG. 4. As shown in FIG. 5B, the method 500' includes steps 502-518 discussed above with respect to FIG. 5A. As such, these steps are not repeated here with respect to FIG. 5B, but instead, the descriptions of steps 502-518 provided above with respect to FIG. 5A are relied upon.

Generally speaking, the method 500' may be implemented, for instance, in accordance with an SLA 330 that specifies what percentage of the total power usage should be from a renewable power source, while maintaining certain levels of compute performance. In addition, or alternatively, the method 500' may be implemented according to a performance policy in which the SLA 330 may, for instance, indicate that a predetermined level of workload performance be maintained, regardless of the amount of power generated by the renewable power source 140.

Following determination of the workload level that corresponds to the available cooling capacity at step 516, the controller 302 may determine whether the conditions set forth in an SLA 330 are met, at step 550. The conditions may include, for instance, the number of electronic components 1116a-116n that are to be available for performing a particular workload 320, the amount of time the electronic components 116a-116n are to be available, the time by which a workload 320 is to be completed, etc.

In any event, if all of the conditions in the SLA 330 are met, the controller 302 may perform step 518, as discussed above. If however, one or more of the SLA 330 conditions are not met, the controller 302 may activate a fast-start power generation system, for instance, a separate nonrenewable power source 150, at step 554. The power generation system activated at step 554 is considered a "fast-start" power generation system because the power generation system 150 is configured to quickly supply power to either or both of the electronic components 116a-116n and the cooling system components 310, as indicated at step 556. The fast-start power generation systems 150 may include, for instance, diesel or bi-fuel gas-turbine based power generation systems.

In the event that the fast-start power generation system 150 is configured to supply power to the electronic components 116a-116n, the level of power received from the nonrenewable power source 150 may be augmented by a separate fast-start power generation system 150, to thereby substantially reduce or eliminate lag in performing the workload 320. In addition, or alternatively, the fast-start power generation system 150 may supplement the power consumed by the cooling system components to meet the power dissipation levels of the electronic components 116a-116n.

Following step 556, the controller 302 may repeat steps 512, 504-518, and 550-556, to continually monitor and control the workload and cooling conditions in the data center 100, 100', such that they comply with conditions set forth in one or more SLA's 330.

Figure 6:
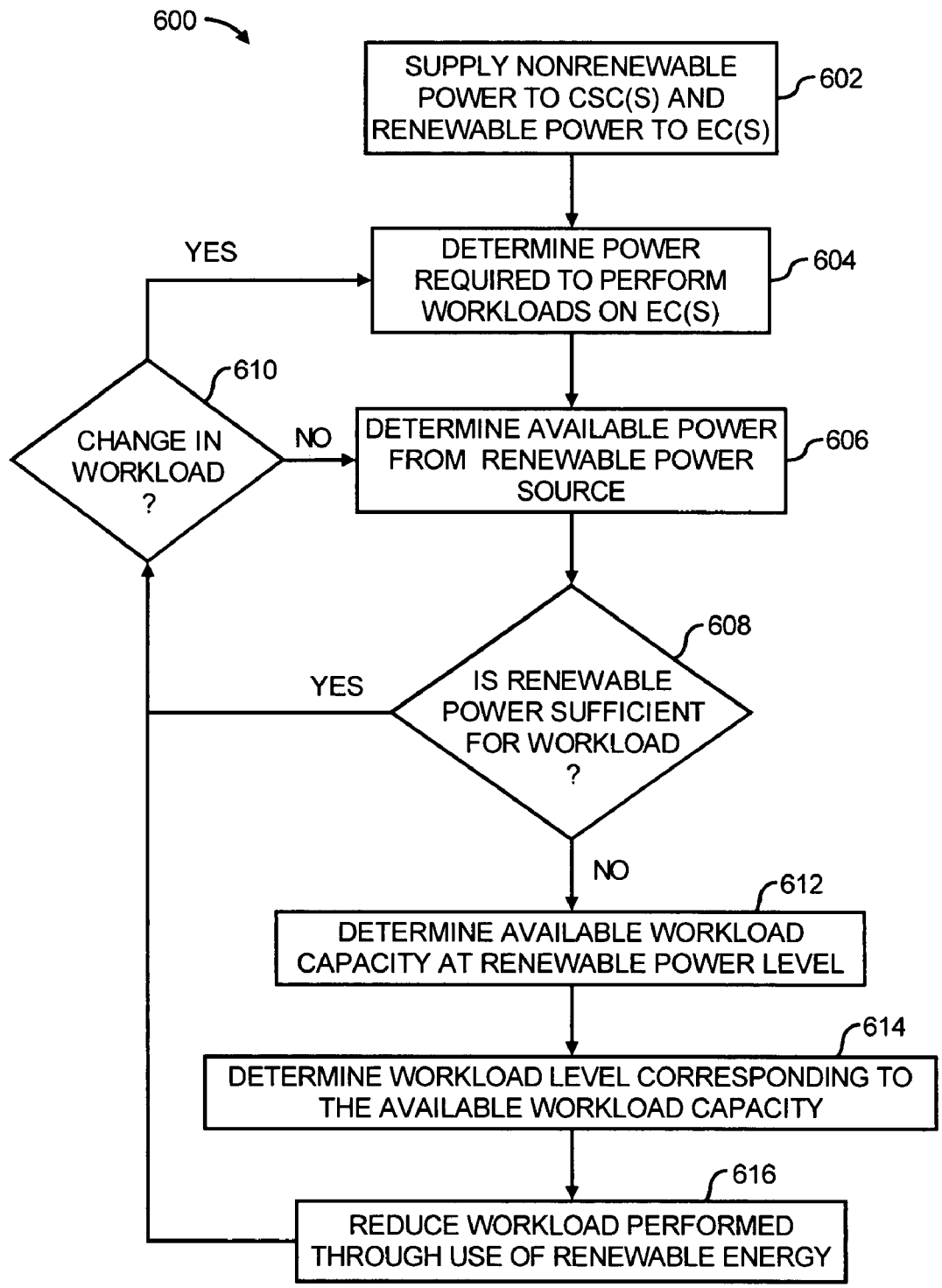
FIG. 6 shows a flow diagram of a method for varying the power supplied to balance power usage and workload performance, according to a further embodiment of the invention.

With reference now to FIG. 6, there is shown a flow diagram of a method 600 for varying the power supplied to balance power usage and workload performance, according to another example. The method 600 may be considered as providing a more detailed illustration of step 408 in FIG. 4, according to another example. In addition, the method 600 is similar to the method 500, in that, the method 600 also depicts an operation of the system manager 130 in which a "sustainability" policy may be implemented. More particularly, in implementing the method 600, the system manager 130 may substantially ensure that the costs associated with maintaining the electronic components 116a-116n within predetermined thermal conditions may be sustained within predefined limits. In addition, or alternatively, the method 600 may be performed, for instance, in accordance with an SLA 330 that indicates that all of the computing performed for the workload 320 is to be powered by the renewable power source 140, as may also be set by an environmentally conscious client.

Initially, at step 602, the controller 302 is configured to implement the power diverter 306 to supply power to the electronic components 116a-116n from the renewable power source 140 and to supply power to the cooling system components 310 from the nonrenewable power source 150. In addition, at step 604, the controller 302 may determine the amount of power the electronic components 116a-116n require to perform a given workload 320, for instance, based upon information received by the workload manager 308. At step 606, the controller 302 may also determine the amount of power being generated by the renewable power source 140, and may thus determine how much power is available from the renewable power source 140.

At step 608, the controller 302 may determine whether the renewable power source 140 is generating a sufficient amount of power for the electronic components 116a-116n to perform the workload 320. If the controller 302 determines that the renewable power source 140 is generating a sufficient amount of power, the controller 302 may determine whether there has been a change in the workload 320, as indicated at step 610. If there has been a change in the workload 320, the controller 302 may determine the amount of power required to perform the changed workload at step 604.

Following step 604, or if there has not been a change in the workload 320, the controller 302 may determine the amount of power being generated by the renewable power source 140 at step 606. In addition, the controller 302 may repeat steps 604-610 to continually monitor the workload and cooling conditions in the data center 100, 100'.

With reference back to step 608, if the controller 302 determines that the renewable power source 140 is generating an insufficient amount of power, the controller 302 may determine the available workload capacity of the electronic components 116a-116n at the current renewable power source 140 power generation level, as indicated at step 614. In addition, at step 614, the controller 302 may determine the workload level that corresponds to the available workload capacity.

At step 616, the controller 302 may invoke or implement the workload manager 308 to reduce the workload performance to the workload level determined at step 614. The controller 302 may reduce the workload performance by, for instance, reducing the number of electronic components 116a-116n being utilized to perform workloads 320, by scheduling performance of new workloads 320 at a later time, etc. The controller 302 may additionally rate the workloads according to their criticalities and may stop performance of or schedule a later performance of those workloads 320 that are considered as being relatively less critical. The criticalities of the workloads 320 may be based, for instance, on various conditions set forth in SLA's 330.

Following step 616, the controller 302 may repeat steps 610 and 604-616 as discussed above, to continually monitor and control the workload and cooling conditions in the data center 100, 100', and thereby continually balance renewable power usage with workload performance.

Figure 7:
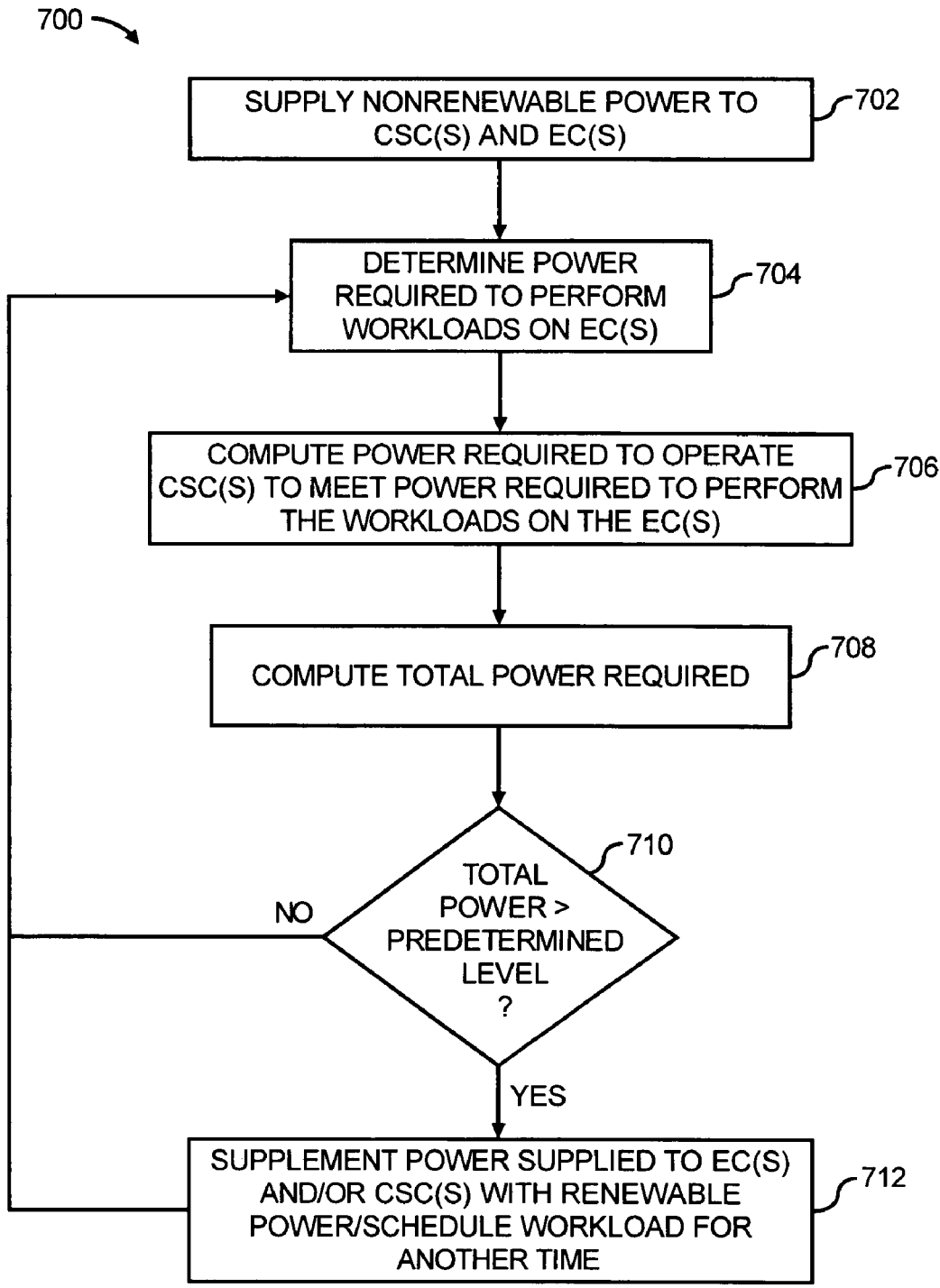
FIG. 7 shows a flow diagram of a method for varying the power supplied to balance power usage and workload performance, according to a yet further embodiment of the invention.

With reference now to FIG. 7, there is shown a flow diagram of a method 700 for varying the power supplied to balance power usage and workload performance, according to a further example. The method 700 may be considered as providing a more detailed illustration of step 408 in FIG. 4, according to a further example. In addition, the method 700 may generally be performed to substantially maintain energy costs at predefined levels. More particularly, for instance, in the method 700, energy supplied from the renewable power source 140 may be utilized when the power requirements in the data center 100, 100' exceed a predefined level. In addition, or alternatively, the method 700 may be performed, for instance, in accordance with an SLA 330 that indicates that a predefined amount of power be supplied from a nonrenewable power source 150.

Initially, at step 702, the controller 302 is configured to implement the power diverter 306 to supply power to the electronic components 116a-116n and to supply power to the cooling system components 310 from the nonrenewable power source 150.

At step 704, the controller 302 may determine the amount of power the electronic components 116a-116n require to perform a given workload 320. At step 706, the controller 302 may compute the amount of power required to operate the cooling system components 310 to meet the power required by the electronic components 116a-116n to perform the given workload 320.

At step 708, the controller 302 may compute the total power required to operate both the electronic components 116a-116n and the cooling system components 310. Thus, for instance, the controller 302 may sum the power required determined at step 704 and the power required computed at step 706. In addition, the controller 302 may determine whether the total power required exceeds a predetermined level, as indicated at step 710.

The predetermined level may be based upon one or more factors. For instance, the predetermined level may comprise a condition set forth in an SLA 330. In this example, the predetermined level may be set by a client such that the total costs associated with powering the electronic components 116a-116n and the cooling system components 310 may substantially be capped. According to another example, the predetermined level may be set by a data center 100, 100' user to also balance between data center 100, 100' performance and energy costs.

In any regard, if, at step 710, the total power is below the predetermined level, the controller 302 may repeat steps 704-710 to continually monitor energy usage in the data center 100, 100'. Alternatively, however, if the total power exceeds the predetermined level at step 710, the controller 302 may activate or otherwise implement the power diverter 306 to supply power to either or both of the cooling system components 310 and the electronic components 116a-116n from the renewable power source 140, at step 712. In addition, or alternatively, at step 712, the controller 302 may schedule a workload 320 to be performed at a later time, such as, when the pricing of power from the nonrenewable power source 150 decreases, when a greater amount of power will be available from the renewable power source 140, etc.

Following step 712, the controller 302 may repeat steps 704-712 to continually monitor and control the provisioning of power between the renewable and nonrenewable power sources 140 and 150.

The operations set forth in the methods 400, 500, 500', 600, and 700 may be contained as at least one utility, program, or subprogram, in any desired computer accessible medium. In addition, the methods 400, 500, 500', 600, and 700 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 8:
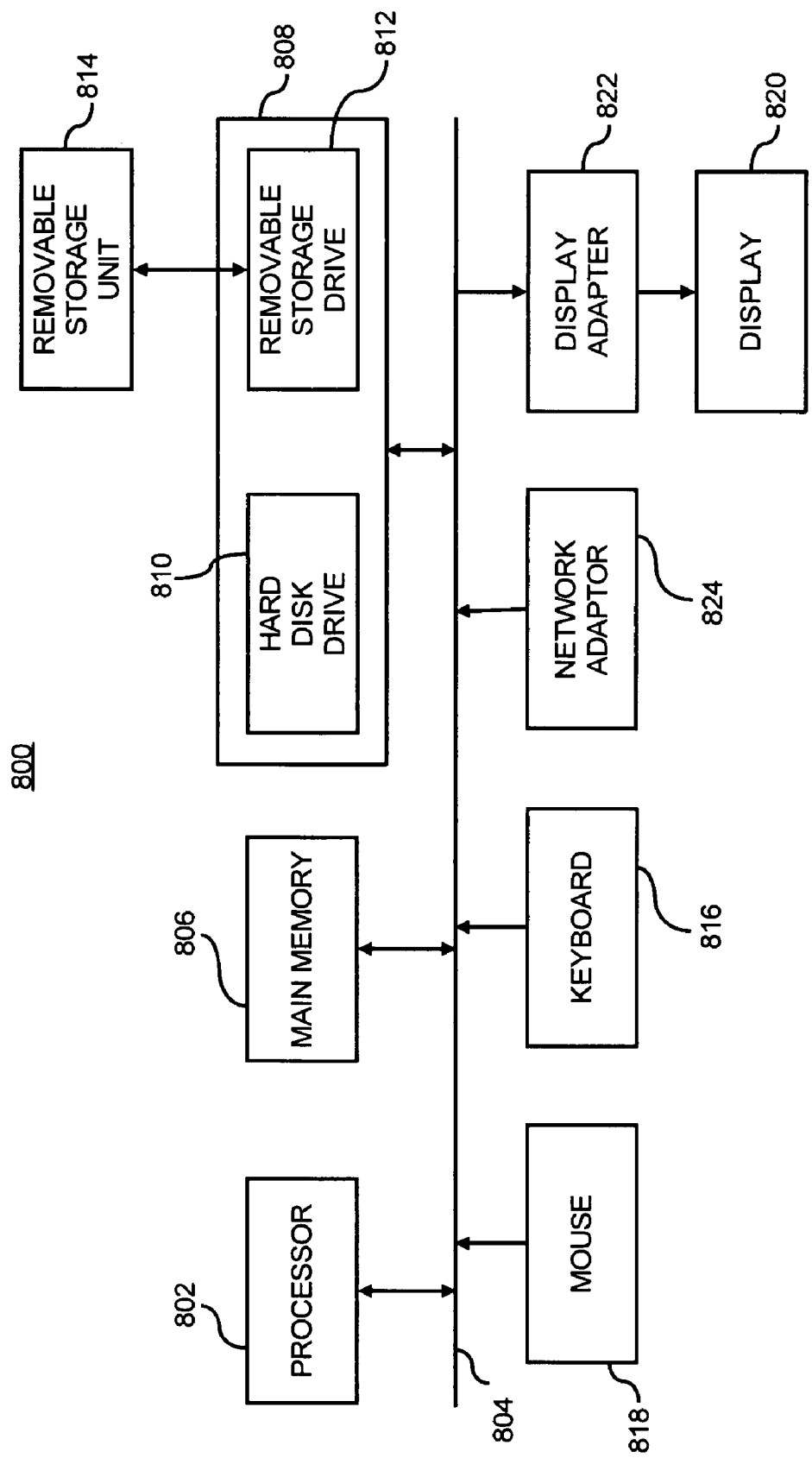
FIG. 8 illustrates a computer system, which may be employed to perform various functions described herein, according to an embodiment of the invention.

FIG. 8 illustrates a computer system 800, which may be employed to perform the various functions of system manager 130 described herein above, according to an example. In this respect, the computer system 800 may be used as a platform for executing one or more of the functions described hereinabove with respect to the system manager 130.

The computer system 800 includes a processor 802, which may be used to execute some or all of the steps described in the methods 400, 500, 500', 600, and 700. Commands and data from the processor 802 are communicated over a communication bus 804. The computer system 800 also includes a main memory 806, such as a random access memory (RAM), where the program code for, for instance, the system manager 130, may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for balancing power usage in a data center having cooling system components and electronic components may be stored.

The removable storage drive 810 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor 802 may communicate over a network, for instance, the Internet, LAN, etc., through a network adaptor 824.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for balancing renewable power usage and workload performance in a room having cooling system components and electronic components, wherein the room receives power from a renewable power source and a nonrenewable power source, said method comprising:

supplying power to either or both of at least one cooling system component and at least one electronic component from the renewable power source;

supplying power to either or both of the at least one cooling system component and the at least one electronic component from the nonrenewable power source; and varying power supplied from the renewable power source and the nonrenewable power source to substantially minimize the amount of power supplied by the nonrenewable power source while enabling a desired level of workload to be performed by the at least one electronic component to thereby balance power usage and workload performance between the at least one cooling system component and the at least one electronic component.

2. The method according to claim 1, further comprising:

optimizing the room for substantially minimized energy usage.

3. The method according to claim 1, wherein varying the power supplied further comprises varying a workload on the at least one electronic component by at least one of implementing virtual machine technology to migrate the workload from one electronic component to another electronic component and scheduling the workload to be performed at a later time.

4. The method according to claim 1, wherein varying the power further comprises varying the power according to one or more provisions set forth in a service level agreement.

5. The method according to claim 1, wherein varying power further comprises varying power to substantially ensure that costs associated with maintaining the at least one electronic component within predetermined thermal conditions is sustained within predefined limits.

6. The method according to claim 1, wherein varying power further comprises varying power to substantially ensure that a predetermined level of workload performance is maintained on the at least one electronic component.

7. The method according to claim 1, wherein supplying power further comprises:
supplying power to at least one cooling system component from the renewable power source and supplying power to at least one electronic component from the nonrenewable power source; and
wherein varying power further comprises varying a workload on the at least one electronic component to balance the power usage and the workload performance.

8. The method according to claim 7, further comprising:
determining an amount of power required to perform a workload on the at least one electronic component;
computing an amount of power required to operate the cooling system components to adequately cool the at least one electronic component based upon the amount of power determined to be required to perform the workload;
determining an amount of power supplied from the renewable power source to the cooling system components;
determining whether there is a sufficient amount of power from the renewable power source to meet the amount of power required to operate the cooling system components to adequately cool the at least one electronic component; and
reducing the workload on the at least one electronic component in response to the renewable power source being unable to supply the amount of power required to operate the cooling system components to adequately cool the at least one electronic component.

9. The method according to claim 8, further comprising:
in response to a determination that the renewable power source is supplying an insufficient amount of power to the cooling system components, determining whether a predetermined condition regarding the workload is met; and
wherein the step of reducing the workload, further comprises reducing the workload in response to the predetermined condition being met.

10. The method according to claim 7, further comprising:
determining an amount of power required to perform a workload on the at least one electronic component;
computing an amount of power required to operate the cooling system components to adequately cool the at least one electronic component based upon the amount of power determined to be required to perform the workload;
determining an amount of power supplied from the renewable power source to the cooling system components;
determining whether there is a sufficient amount of power from the renewable power source to meet the amount of power required to operate the cooling system components to adequately cool the at least one electronic component;
in response to a determination that the renewable power source is supplying an insufficient amount of power to the cooling system components, determining whether predetermined conditions regarding the workload is met; and
in response to a determination that at least one of the predetermined conditions is not met, supplying supplemental power to at least one of the cooling system components and the at least one electronic component from a fast-start power generation system.

11. The method according to claim 1, wherein supplying power further comprises:
supplying power to at least one cooling system component from the nonrenewable power source and supplying power to at least one electronic component from a renewable power source; and
wherein varying power further comprises varying a workload on the at least one electronic component according to the amount of power being supplied by the renewable power source, wherein a change in the workload causes a change in the amount of power consumed by the at least one cooling system component.

12. The method according to claim 1, wherein supplying power further comprises:
supplying power to at least one cooling system component and to at least one electronic component from the nonrenewable power source;
determining power required to perform the workload on the at least one electronic component;
computing power required to operate the at least one cooling system component to meet the power required to perform the workload on the at least one electronic component;
computing a total power requirement;
determining whether the total power requirement exceeds a predetermined level; and
wherein varying power further comprises supplying supplemental power to either or both of the at least one cooling system component and the at least one electronic component from the renewable power source.

13. A system for balancing renewable power usage and workload performance in a room having cooling system components and electronic components, wherein the room is configured to receive power from a renewable power source and a nonrenewable power source, said system comprising:
a power diverter for varying delivery of power from at least one of the renewable power source and the nonrenewable power source to at least one cooling system component and at least one electronic component;
a controller for controlling the power diverter to vary delivery of power from the renewable power source and the nonrenewable power source to substantially minimize the amount of power supplied by the nonrenewable power source while enabling a desired level of workload to be performed by the at least one electronic component to thereby balance power usage and workload performance between the at least one cooling system component and the at least one electronic component.

14. The system according to claim 13, further comprising:
a workload manager for managing workload performed by the electronic components; and wherein the controller is configured to control the workload manager to vary workload on the at least one electronic component based upon levels of power generated by the renewable power source.

15. The system according to claim 14, wherein the controller is further configured to control at least one of the power diverter and the workload manager to balance power usage and workload performance as set forth in a service level agreement.

16. The system according to claim 14, wherein the controller is further configured to control at least one of the power diverter and the workload manager to substantially ensure that costs associated with maintaining the at least one electronic component within predetermined thermal conditions is sustained within predefined limits.

17. The system according to claim 14, wherein the controller is further configured to control at least one of the power diverter and the workload manager to substantially ensure that a predetermined level of workload performance is maintained on the at least one electronic component.

18. The system according to claim 14, wherein the controller is further configured to control the workload manager to reduce workload on at least one of the electronic components when the renewable power source is unable to generate sufficient power for the cooling system components to maintain the electronic components within a predetermined environmental condition range.

19. The system according to claim 14, further comprising:
a fast-start power generation system; and
wherein the controller is further configured to activate the fast-start power generation system to supply either or both of the at least one electronic component and the at least one cooling system component with supplemental power when the renewable power source is unable to generate sufficient power for the at least one cooling system component to maintain the at least one electronic component within a predetermined environmental condition range.

20. A non-transitory computer readable storage medium on which is embedded one or more computer programs, said one or more computer programs implementing a method for balancing renewable power usage and workload performance in a room having cooling system components and electronic components, wherein said room receives power from a renewable power source and a nonrenewable power source, said one or more computer programs comprising a set of instructions for:
supplying power to either or both of at least one cooling system component and at least one electronic component from the renewable power source;
supplying power to either or both of the at least one cooling system component and the at least one electronic component from the nonrenewable power source; and
varying power supplied from the renewable power source and the nonrenewable power source to substantially minimize the amount of power supplied by the nonrenewable power source while enabling a desired level of workload to be performed by the at least one electronic component to thereby balance power usage and workload performance between the at least one cooling system component and the at least one electronic component.

* * * * *